United States Patent
Long et al.

(10) Patent No.: US 10,111,380 B2
(45) Date of Patent: *Oct. 30, 2018

(54) HEADER HEIGHT CONTROL SYSTEM WITH MULTIPLE HEIGHT SENSORS

(71) Applicant: CNH Industrial America LLC, New Holland, PA (US)

(72) Inventors: Zachary Long, Harleysville, PA (US); Joel T. Cook, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/839,513

(22) Filed: Dec. 12, 2017

(65) Prior Publication Data

US 2018/0098491 A1 Apr. 12, 2018

Related U.S. Application Data

(63) Continuation of application No. 15/262,439, filed on Sep. 12, 2016, now Pat. No. 9,980,431.

(51) Int. Cl.
*A01D 34/00* (2006.01)
*A01D 41/127* (2006.01)
*A01D 41/14* (2006.01)

(52) U.S. Cl.
CPC ......... *A01D 34/006* (2013.01); *A01D 41/127* (2013.01); *A01D 41/145* (2013.01)

(58) Field of Classification Search
CPC .... A01D 34/006; A01D 41/127; A01D 41/12; A01D 41/14; A01D 41/141; A01D 41/145; A01D 45/10; A01D 47/00
(Continued)

(56) References Cited

U.S. PATENT DOCUMENTS 4,141,200 A * 2/1979 Johnson ............... A01D 41/141 171/9
4,944,141 A * 7/1990 Orlando ............... A01D 41/145 56/10.2 E
(Continued)

FOREIGN PATENT DOCUMENTS

| EP | 2156725 A2 | 2/2010 |
| EP | 2695511 A1 | 2/2014 |
| EP | 2832206 A1 | 2/2015 |

OTHER PUBLICATIONS

Communication Relating to the Results of the Partial International Search for PCT/US2017/050740, dated Nov. 9, 2017, 11 pages.

*Primary Examiner* — Robert E Pezzuto
(74) *Attorney, Agent, or Firm* — Peter K. Zacharias

(57) ABSTRACT

A header system includes a frame; a cutter carried by the frame; a cutter sensor associated with the cutter which outputs a cutter height signal; a gauge wheel carried by the frame behind the cutter; a wheel sensor associated with the gauge wheel which outputs a wheel position signal; and a controller electrically coupled to the cutter height sensor and the wheel sensor. The controller is configured to: receive the cutter height signal; receive the wheel position signal; compare the cutter height signal and the wheel position signal to determine a terrain irregularity is present; and activate one or more actuators to adjust the frame in response to determining the terrain irregularity is present.

17 Claims, 13 Drawing Sheets

(58) Field of Classification Search
USPC .......... 56/10.2 A–10.2 G, 10.2 R, 15.8, 17.2, 56/208; 172/2–11; 701/50
See application file for complete search history.

(56) References Cited

U.S. PATENT DOCUMENTS

| | | | | |
|---|---|---|---|---|
| 5,653,292 | A * | 8/1997 | Ptacek | A01B 63/114 |
| | | | | 172/239 |
| 6,758,029 | B2 * | 7/2004 | Beaujot | A01D 41/141 |
| | | | | 56/10.2 E |
| 7,401,455 | B1 * | 7/2008 | Cleodolphi | A01D 45/10 |
| | | | | 56/10.2 E |
| 7,647,753 | B2 * | 1/2010 | Schlipf | A01D 41/141 |
| | | | | 56/10.2 E |
| 7,661,251 | B1 * | 2/2010 | Sloan | A01D 41/141 |
| | | | | 56/10.2 E |
| 7,681,382 | B2 * | 3/2010 | Viaud | A01D 89/004 |
| | | | | 56/10.2 E |
| 7,992,369 | B2 * | 8/2011 | Coers | A01D 41/141 |
| | | | | 56/10.2 E |
| 8,245,489 | B2 * | 8/2012 | Talbot | A01D 41/141 |
| | | | | 56/10.2 E |
| 9,585,309 | B2 * | 3/2017 | Posselius | A01D 47/00 |
| 2014/0041351 | A1 * | 2/2014 | Bollin | A01D 41/127 |
| | | | | 56/10.2 E |

\* cited by examiner

HEADER HEIGHT CONTROL SYSTEM WITH MULTIPLE HEIGHT SENSORS

CROSS-REFERENCE TO RELATED APPLICATIONS

This application is a continuation of U.S. patent application Ser. No. 15/262,439 filed Sep. 12, 2016, which is incorporated by reference in its entirety.

FIELD OF THE INVENTION

The present invention relates to agricultural vehicles and, more particularly, to agricultural harvesters equipped with a header.

BACKGROUND OF THE INVENTION

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves and is transported to a grain pan. From the grain pan the grain is cleaned using a cleaning system, and is then transported to a grain tank onboard the combine. The cleaning system includes a cleaning fan which blows air through oscillating sieves to discharge chaff and other debris toward the rear of the combine. Non-grain crop material such as straw from the threshing section proceeds through a straw chopper and out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

In combines with headers that are rigidly attached to the combine feeder house, the combine is typically equipped with a header height control (HHC) system which adjusts the height and tilt angle of the header relative to the ground. The HHC system is particularly important to prevent the header from contacting objects in the field as the combine harvests crop material and also helps to keep the cutting apparatus of the header at a desired height relative to the ground in order to obtain the desired crop collection. Known HHC systems include an actuator linked to a frame of the header, sensors which detect the height of the cutting apparatus relative to the ground, and a controller which controls the actuator based on the sensed height of the cutting apparatus. One type of sensor that can be utilized is a cutter sensor which contacts the ground and, based on the flexing of the sensor, determines the relative height of the cutting apparatus to the ground. A known problem with such cutter sensors is that once the cutter sensor is off the ground, the HHC system cannot accurately determine whether the cutter sensor is two inches or two feet above the ground and therefore cannot reliably determine how to adjust the height and/or tilt angle of the header to return the header to the desired position.

Some headers also include one or more spring loaded gauge wheels which stay in contact with the ground and help keep the header level as the combine travels across the field. One particular problem that is encountered with such gauge wheels occurs when the header travels over a large terrain irregularity which causes the cutter sensor to leave the ground and the spring of the gauge wheel(s) to fully compress. In such a situation, the biasing force from the spring into the ground attempts to lift the header and, due to the rigid connection of the header to the combine, the combine off the ground. This is further compounded by the HHC system sensing that the cutter sensor is off the ground and attempting to lower or tilt the header toward the ground in order to return the cutter sensor, and thus the cutting apparatus, back to the ground. The net effect of these simultaneous motions can cause the front of the header to be pointed into the ground as the combine moves forward, forcing the header to dig into the ground and potentially causing significant damage to the header and the combine.

What is needed in the art is a HHC system that can overcome some of the previously described disadvantages of known HHC systems.

SUMMARY OF THE INVENTION

In accordance with an aspect of the present invention, there is provided a sensor associated with a gauge wheel of a header which can, in conjunction with a cutter sensor or alone, allow more accurate control of a height and/or tilt angle of the header.

In accordance with another aspect of the present invention, there is provided a header system including: a frame; a cutter carried by the frame; a cutter height sensor associated with the cutter and configured to output a cutter height signal; a gauge wheel carried by the frame behind the cutter; a wheel sensor associated with the gauge wheel and configured to output a wheel position signal; and a controller electrically coupled to the cutter height sensor and the wheel sensor. The controller is configured to: receive the cutter height signal; receive the wheel position signal; compare the cutter height signal and the wheel position signal to determine a terrain irregularity is present; and activate at least one actuator of an actuator system to adjust the frame in response to determining the terrain irregularity is present.

In accordance with yet another aspect of the present invention, there is provided a header system including: a frame; a cutter carried by the frame; a gauge wheel carried by the frame behind the cutter; a wheel sensor associated with the gauge wheel and configured to output a wheel overload signal when the wheel sensor detects the gauge wheel is displaced to a stroke end; and a controller electrically coupled to the wheel sensor. The controller is configured to: detect the wheel overload signal; and activate at least one actuator of an actuator system to adjust the frame in response to receiving the wheel overload signal.

An advantage of exemplary embodiments of the header system described herein is that providing the wheel position sensor allows more information about the terrain that the header is traveling on to be received by the controller, allowing the controller to more accurately control the height and tilt angle of the header.

Another advantage of exemplary embodiments of the header system described herein is that information from the cutter sensor and wheel position sensor allows the controller to predict a slope of the ground that the header is traveling across and adjust the tilt angle and/or height of the header accordingly.

Still another advantage of exemplary embodiments of the header system described herein is that the wheel sensor outputting a wheel overload signal can allow the controller to adjust the header so as to avoid the situation where the front of the header digs into the ground and causes significant damage to the header and/or combine.

Still another advantage of exemplary embodiments of the header system described herein is that the controller can be configured to adjust one or more of actuators of an actuator system depending on how the cutter and/or gauge wheel are oriented to adjust the frame appropriately for the particular situation which caused the change in position of the cutter and/or gauge wheel.

BRIEF DESCRIPTION OF THE DRAWINGS

The above-mentioned and other features and advantages of this invention, and the manner of attaining them, will become more apparent and the invention will be better understood by reference to the following description of exemplary embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
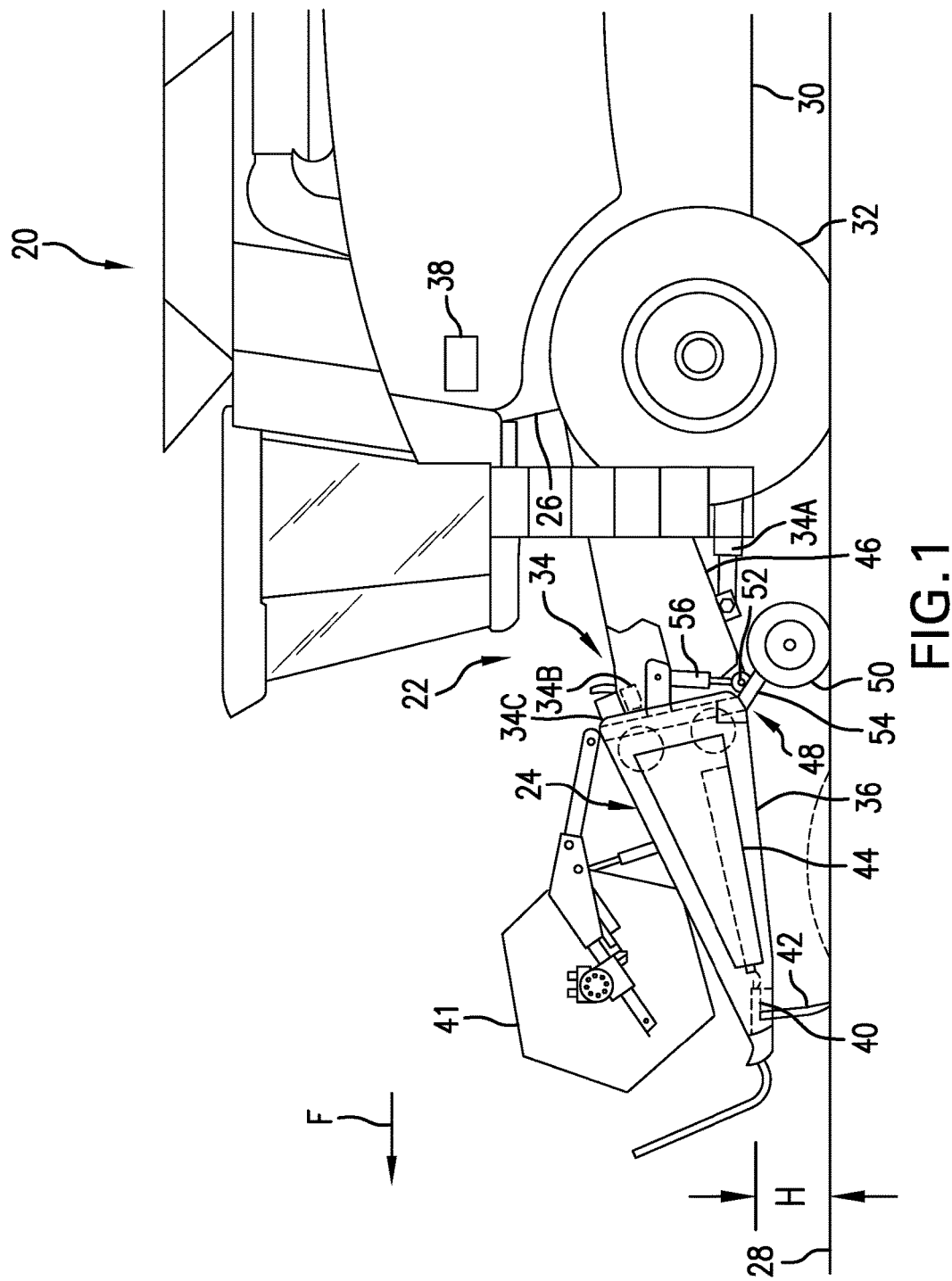
FIG. 1 is a side view of an exemplary embodiment of an agricultural vehicle formed in accordance with the present invention.

Referring now to the drawings, and more particularly to FIG. 1, an exemplary embodiment of an agricultural machine 20 formed in accordance with the present invention is shown, including a header height control (HHC) system 22 operable for controlling height and tilting adjustment of a header 24 carried on a front end 26 of machine 20, as machine 20 moves over a ground surface 28, as denoted by arrow F. Harvesting machine 20 is a typical, self-propelled combine harvester having a chassis 30 carrying a conventionally configured and operable engine and power train that drives tracks or wheels 32. The engine can power a cutter 40 of header 24, which can include a conventionally configured and operable sickle cutter, disk cutters, or the like, as well as a reel 41, and gathering apparatus 44, which here is a draper belt system but could be an auger device, all of which are conventionally configured and operable.

A center region of header 24 is supported on machine 20 by a feeder 46, the front end of which is movable upwardly and downwardly relative to machine 20 for setting a height, denoted by height H in FIG. 1, of the cutter 40. The cut plants will then fall onto a floor or pan of header 24, aided by reel 42, and pass onto gathering apparatus 44. The cut plants are then carried by apparatus 44 to an inlet opening of feeder 46, which will induct the cut plants and carry them internally therethrough into machine 20 for processing, all in the conventional, well known manner.

To control the height, lateral tilting and fore-aft tilting of the header 24, the chassis 30 carries an actuator system 34 with actuators 34A, 34B, and 34C which can be linked to a frame 36 of the header 24 and/or the feeder 46. One or more of the actuators 34A, 34B, 34C can also be mounted to the chassis 30, if desired. The actuators 34A, 34B, 34C can be pneumatic or hydraulic cylinders or other types of actuators that exert forces on the frame 36, or a component connected to the frame 36 such as the feeder 46, in order to lift, lower, and tilt the header 24 in a conventional manner. The actuator system 34 can include, for example, a height actuator 34A which is configured to vertically raise and lower the frame 36 to adjust the height of the header 24; a lateral tilt actuator 34B which is configured to adjust the lateral tilt of the frame 36, i.e., side-to-side tilting of the header 24 relative to the forward direction F; and a fore-aft actuator 34C which is configured to adjust the fore-aft tilt of the frame 36, i.e., tilting of the header 24 back-and-forth relative to the forward direction F. It should be appreciated that reference to "tilt" and "tilting" of the header 24 herein can refer to both lateral and fore-aft tilting, unless only one of the types of tilt is specified. The actuator system 34 is electrically coupled to a controller 38 which sends signals to the actuators 34A, 34B, 34C in order to control the operation of the actuators 34A, 34B, 34C. As used herein, the controller 38 is "electrically coupled" to the actuator system 34 in the sense that the controller 38 is electrically coupled to each actuator 34A, 34B, 34C of the actuator system 34 so the controller 38 can activate each actuator 34A, 34B, 34C. The actuator system 34 and controller 38 can be configured so the controller 38 can activate each actuator 34A, 34B, 34C of the actuator system 34 independently of the other actuators. The controller 38 can include, for example, an electrical processing circuit or central processing unit and memory that allow the controller 38 to send and receive electrical signals to control various components of the vehicle 20, which will be described further herein. In the case of pneumatic or hydraulic cylinders, the controller 38 can control one or more valves (not shown) of the cylinder to fill or drain fluid from within the cylinder, as is known. It should be appreciated that other types of actuators 34A, 34B, 34C can be used other than cylinders, such as electrically powered actuators, in which case the controller 38 will control the mechanism that causes extension and retraction of the actuators 34A, 34B, 34C. It should be appreciated that while the actuator system 34 is shown and described as including three actuators 34A, 34B, and 34C, the actuator system 34 can have two actuators or may have more than three actuators to control positioning of the frame 36.

The controller 38 is also electrically coupled to a cutter sensor 42 associated with the cutter 40 and a wheel sensor 48 associated with a gauge wheel 50 which is carried by the frame 36 behind the cutter 40. The cutter sensor 42 detects the height H of the cutter 40 relative to the ground surface 28 by contacting the ground surface 28 and flexing. Depending on the flexion of the cutter sensor 42, the cutter sensor 42 sends a cutter height signal to the controller 38 which can have a magnitude indicating the height H of the cutter 40 relative to the ground surface 28. To maintain the cutter 40 at a desired height H relative to the ground surface 28, the controller 38 can have a desired height value of the cutter height signal stored therein. When the received cutter height signal does not match the desired height value, the controller 38 can activate one or more of the actuators 34A, 34B, 34C to raise, lower, or tilt the frame 36, depending on the value of the received cutter height signal, so the cutter 40 assumes the desired height and orientation relative to the ground surface 28.

On flat ground surfaces 28, such as the ground surface 28 shown in FIG. 1, the cutter sensor 42 is sufficient to accurately control the height H of the cutter 40. However, when the ground surface is not level, such as when the vehicle 20 is traveling across a slope, certain instances can arise where the cutter sensor 42 does not convey sufficient information to the controller 38 to accurately control the height H and tilt angle of the header 24. To better follow the contour of such ground surfaces, the header 24 also includes the wheel sensor 48 which is associated with the gauge wheel 50. The wheel sensor 48 can include a mount 52 connected to the frame 36 of the header 24 and also an arm 54 connecting the gauge wheel 50 to the mount 52. To allow the gauge wheel 50 to adjust to changes in height of the terrain as the vehicle 20 travels, the arm 54 can be pivotally connected to the mount 52 so the gauge wheel 50 can pivot relative to the mount 52 during travel. To keep the gauge wheel 50 engaged with the ground surface 28 as the vehicle 20 travels in the forward direction F, a spring 56 can be connected to the arm 54 that biases the gauge wheel 50 toward the ground surface 28.

Figure 2:
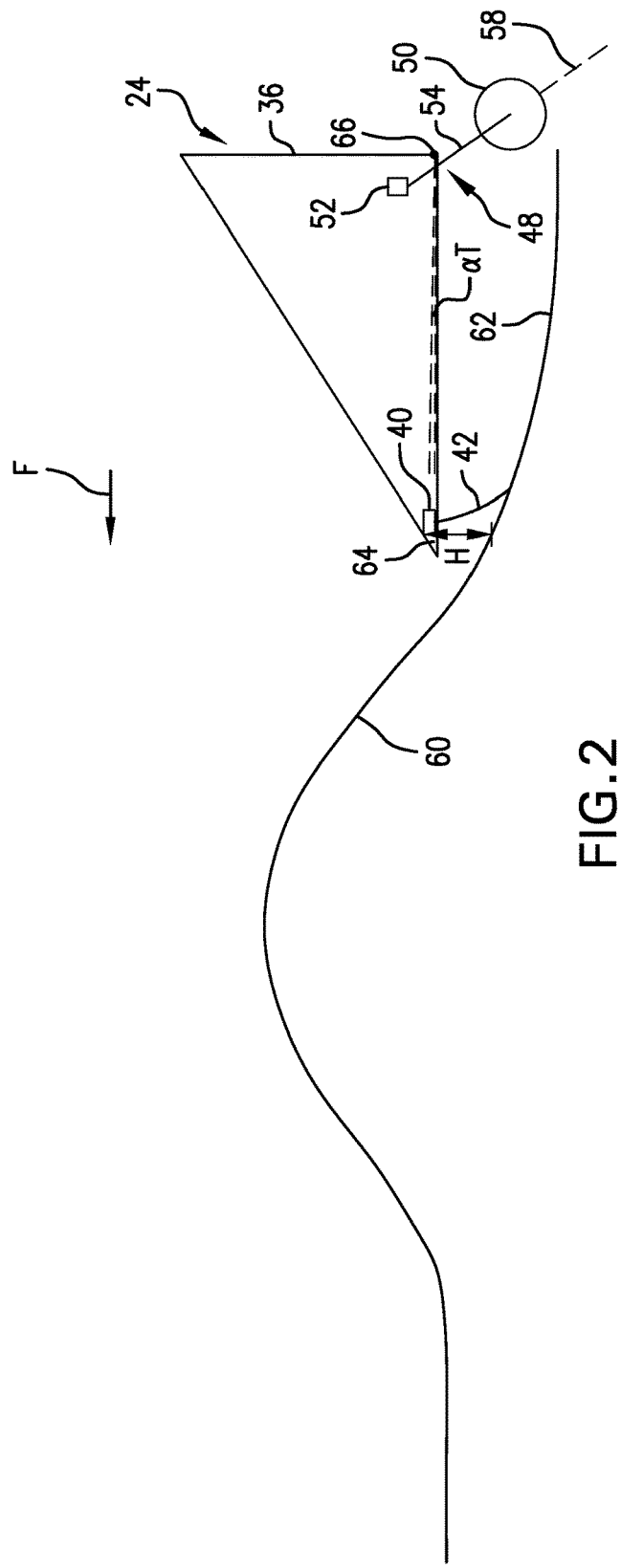
FIG. 2 is a side view of the agricultural vehicle shown in FIG. 1 approaching a slope.

In one exemplary embodiment formed in accordance with the present invention, and referring now to FIG. 2, the wheel sensor 48 is configured to output a wheel position signal to the controller 38 which corresponds to a position of the gauge wheel 50, either linear or angular, relative to the mount 52. For ease of illustration, the header 24 is illustrated in FIGS. 2-11 as a simple triangular shape. As shown herein, the wheel position signal is a wheel angle signal corresponding to a wheel angle $\alpha W$, but it should be appreciated that the wheel position signal can also be a linear wheel position signal corresponding to a height of the gauge wheel 50 or other measurement indicating the linear position of the gauge wheel 50, such as the force stored in the spring 56. The wheel angle $\alpha W$ can be, for example, determined by the current angular position of the arm 54 relative to the mount 52 and a neutral position of the arm 54, with a higher magnitude of the wheel angle signal corresponding to a larger wheel angle $\alpha W$. The neutral position of the arm 54, illustrated as a dashed line 58 in FIG. 2, can be any angular position of the arm 54 relative to the mount 52, such as the angular position of the arm 54 when the header 24 is on a flat ground surface.

As shown in FIG. 2, the wheel angle $\alpha W$ detected by the wheel sensor 48 is approximately 0°, since the current angular position of the arm 54 overlaps the neutral angular position 58 of the arm 54. To allow the controller 38 to detect if the wheel sensor 48 is malfunctioning, the sensor 48 can be configured so the wheel angle signal sent to the controller 38 has a low magnitude, such as 0.5V, when the wheel angle $\alpha W$ is 0°. The magnitude of the wheel angle signal sent to the controller 38 by the wheel sensor 48 can be proportionately increased from the 0.5V, signifying a wheel angle $\alpha W$ of 0°, with the controller 38 determining the wheel angle $\alpha W$ based on the received magnitude of the wheel angle signal. It should be appreciated that the previously described example of how the controller 38 determines the wheel angle $\alpha W$ based on the wheel angle signal from the wheel sensor 48 is exemplary only, and the controller 38 and wheel sensor 48 can be configured in any way suitable to determine relative angle changes of the gauge wheel 50 as the vehicle 20 travels across a field.

Still referring to FIG. 2, it can be seen that the header 24 is approaching a slope 60 formed in a ground surface 62 that the header 24 is traversing. The cutter 40, which can be carried at a front 64 of the frame 36, and the gauge wheel 50, carried behind the cutter 40, have a separation distance relative to the forward direction F therebetween. Due to this separation distance, the cutter 40 and gauge wheel 50 can be traveling on two different grades of the ground surface 62. As the cutter sensor 42 is associated with the cutter 40, the cutter sensor 42 will generally be traveling on portions of the ground surface 62 with the same grade as the cutter 40. As can be seen in FIG. 2, the cutter sensor 42 has begun to flex due to contacting the incline of the slope 60 while the wheel angle $\alpha W$ of the gauge wheel 50 is still 0° due to the gauge wheel 50 being on a flat surface. As the cutter sensor 42 has begun to flex, the cutter sensor 42 can send a cutter height signal to the controller 38 with a magnitude signifying that the height H of the cutter 40 relative to the ground surface 62 has decreased. The controller 38, sensing that the height H of the cutter 40 has been reduced, then compares the received cutter height signal to the received wheel angle signal to determine the corrective action that should be taken to prevent the front 64 of the frame 36 from digging into the incline of the slope 60.

To determine that a terrain irregularity, such as the slope 60, is present, the controller 38 can compare the received cutter height signal to the received wheel angle signal to determine a difference in magnitudes, with the determined difference indicating that the terrain irregularity 60 is present. To simplify determining whether a terrain irregularity is present, the cutter sensor 42 and the wheel sensor 48 can be configured to send their respective signals to the controller 38 with an equal magnitude when the header 24 is on a flat surface and at a desired height of the cutter 40. This allows the controller 38 to easily determine a terrain irregularity is present by sensing there is a difference in the magnitudes of the cutter height signal and the wheel angle signal, with the controller 38 then taking corrective action based on the characteristics of the difference between the signals. It should be appreciated that the difference in magnitudes between the cutter height signal and the wheel angle signal does not have to be zero when the cutter 40 is at the desired height on a flat surface; so long as the controller 38 can determine there is a deviation from a baseline difference between the magnitudes of the cutter height signal and the wheel angle signal, the controller 38 can determine a terrain irregularity is present. It should be further appreciated that while the slope 60 is shown as being in front of the header 24 in FIGS. 2-6, the controller 38 can also determine if a terrain irregularity is encountered by, for example, the drive wheels 32 of the machine 20 utilizing the same general principles and adjust the positioning of the header 24 accordingly.

In the situation shown in FIG. 2, the controller 38 can determine that because there is a difference in the cutter height sensor and the wheel angle signal, the terrain irregularity 60 is present. After determining the terrain irregularity 60 is present, the controller 38 then determines which of said actuators 34A, 34B, 34C to activate and in what manner so the header 24 follows the contour of the ground surface 62. The controller 38 can, for example, determine that because the wheel angle signal indicates that the wheel angle $\alpha W$ is 0°, the difference must be due to the height H of the cutter 40 relative to the ground surface 62 decreasing. To compensate for this change in the ground surface 62 due to the terrain irregularity 60, the controller 38 can activate the fore-aft actuator 34C to tilt the header 24 in the fore-aft direction such that a fore-aft tilt angle $\alpha T$ of the header 24 relative to a pivot point 66 changes from the fore-aft tilt angle $\alpha T$ shown in FIG. 2 to the fore-aft tilt angle $\alpha T$ shown in FIG. 3. It should be appreciated that if the side-to-side tilt of the header 24 is affected by the terrain irregularity 60, the controller 38 can also activate the lateral tilt actuator 34B to compensate for the change in side-to-side tilt, as is known.

Figure 3:
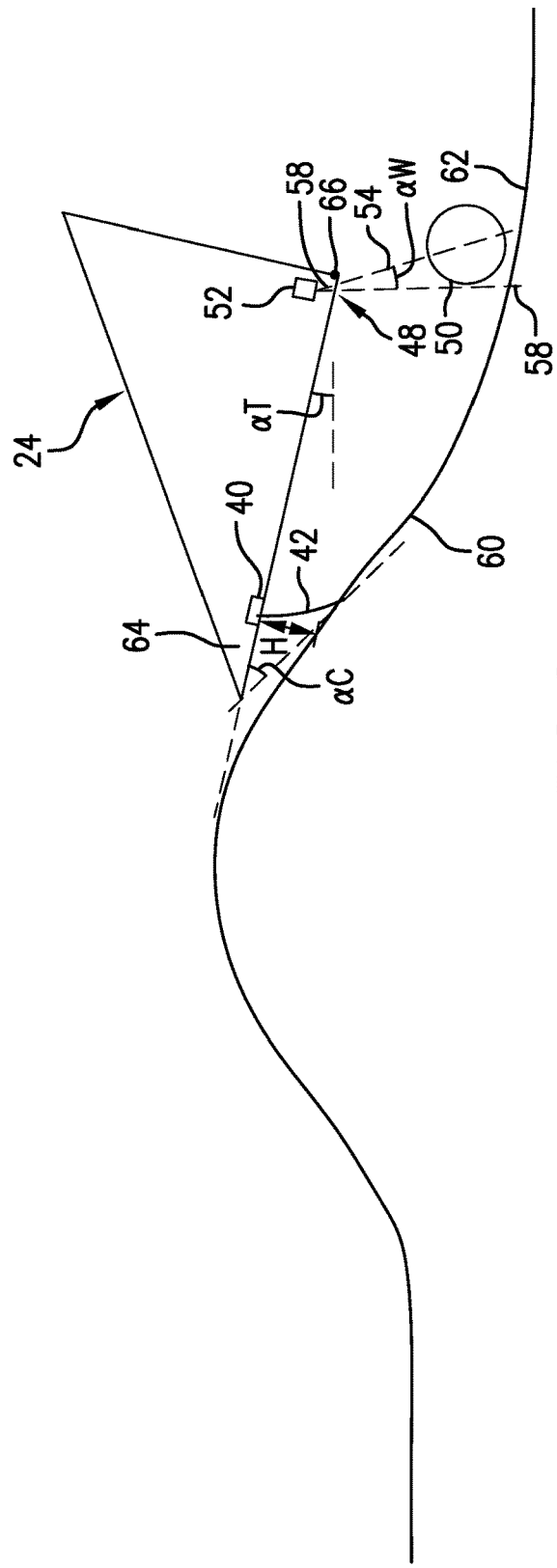
FIG. 3 is a side view of the agricultural vehicle shown in FIGS. 1-2 traveling as a header of the vehicle is traveling up the slope.

Referring now to FIG. 3, it can be seen that the header 24 has been tilted by the fore-aft actuator 34C to a different fore-aft tilt angle $\alpha T$ than the fore-aft tilt angle $\alpha T$ shown in FIG. 2. The fore-aft tilt angle $\alpha T$ shown in FIG. 3 better conforms to the grade of the terrain irregularity 60 so the front 64 of the frame 36 does not dig into the ground of the terrain irregularity 60. The gauge wheel 50, however, has lifted off the ground surface 62 due to the fore-aft tilt angle $\alpha T$ changing, causing the wheel angle $\alpha W$ of the wheel 50 to change due to the gauge wheel 50 being unloaded, resulting in a change in magnitude of the wheel angle signal sent by the wheel sensor 48 to the controller 38. The controller 38 can receive the wheel angle signal and, detecting a change in the wheel angle signal, determine which, if any, of the actuators 34A, 34B, 34C to activate in order to tilt and/or raise the header 24 in response. The controller 38 can be configured to, for example, store that the header 24 had been recently tilted by the fore-aft actuator 34C, and therefore determine that the height actuator 34A can be activated to vertically lower the header 24 so the gauge wheel 50 contacts the ground surface 62 once again. The controller 38 may, for example, be configured to vertically lower the gauge wheel 50 in the event that the wheel angle signal indicates the gauge wheel 50 is not on the ground surface 62 and the fore-aft actuator 34C has been activated to tilt the header 24 within a predetermined tilt time interval, such as 3-5 seconds. It should be appreciated that such configuration is exemplary only, and the controller 38 can be configured to respond in other ways to the gauge wheel 50 lifting off the ground 62. It should be further appreciated that the controller 38 can be configured to activate one or more of the actuators 34A, 34B, 34C based on how previous activation of one or more of the actuators 34A, 34B, 34C affects the wheel angle $\alpha W$ of the gauge wheel 50.

Figure 4:
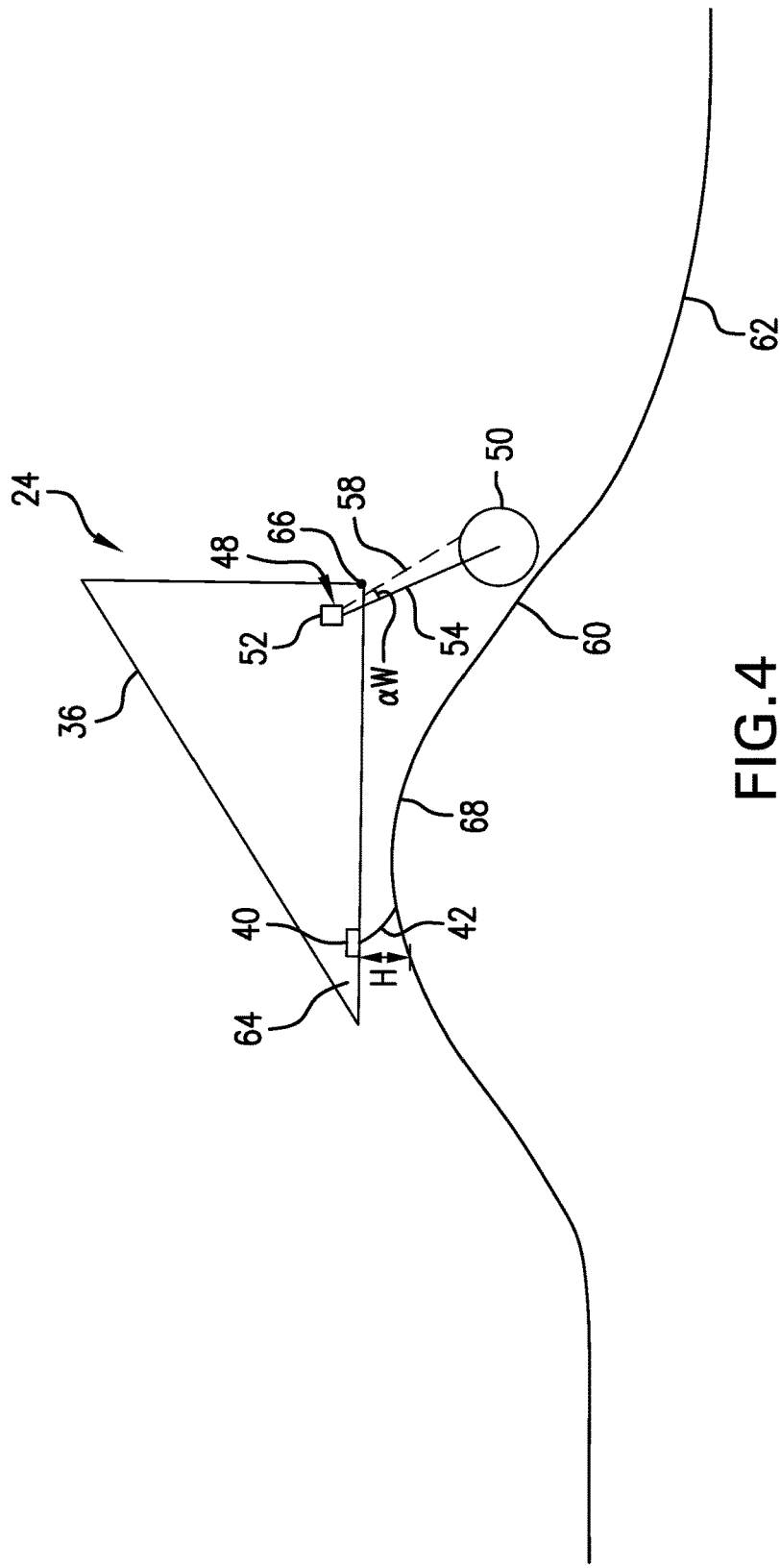
FIG. 4 is a side view of the agricultural vehicle shown in FIGS. 1-3 when the header is near a top of the slope.
Figure 5:
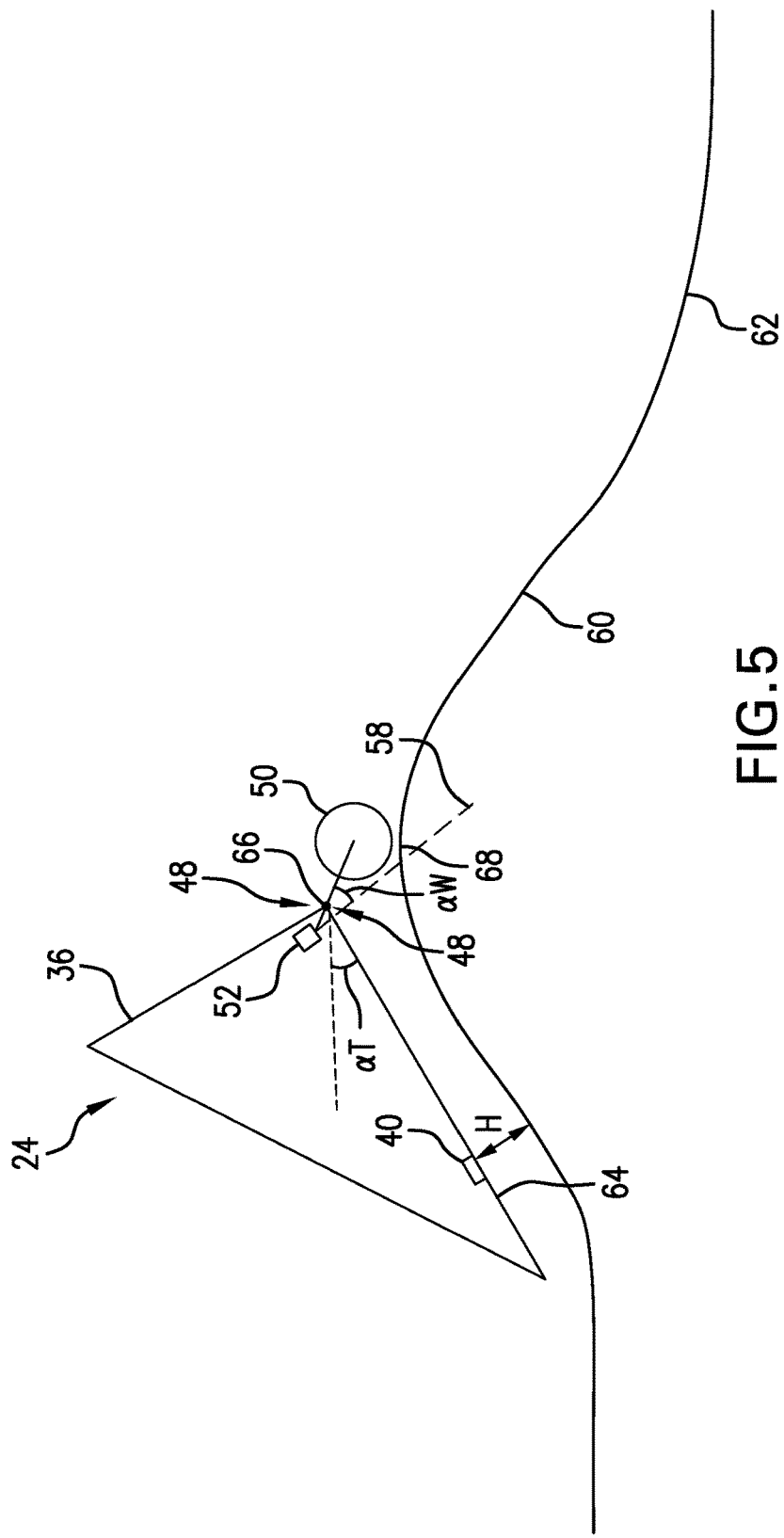
FIG. 5 is a side view of the agricultural vehicle shown in FIGS. 1-4 as the header descends down the slope.
Figure 6:
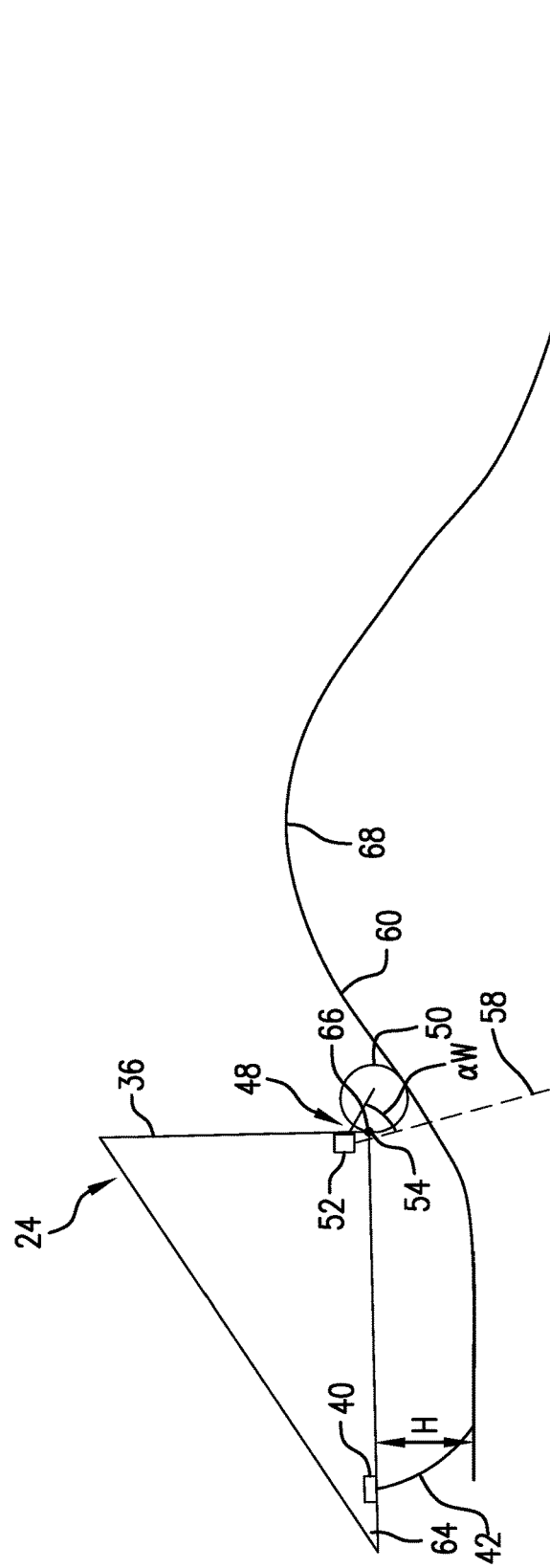
FIG. 6 is a side view of the agricultural vehicle shown in FIGS. 1-5 as the header approaches a bottom of the slope.

Referring now to FIGS. 4-6, it can be seen in FIG. 4 that the header 24 has advanced such that the cutter sensor 42 has progressed past a top 68 of the terrain irregularity 60 and the cutter sensor 42 and the wheel sensor 48 are on opposite sides of the top 68 of the terrain irregularity 60, i.e., the cutter sensor 42 is beginning to descend the terrain irregularity 60 while the wheel sensor 48 is still ascending the terrain irregularity 60. In such a situation, the controller 38 can be configured to sense that the header 24 is passing over the top 68 of the terrain irregularity 60, as shown in FIG. 5, and adjust the fore-aft tilt angle $\alpha T$ of the header 24 to match the slope of the terrain irregularity 60 without any part of the header 24 digging into the ground surface 62. As the header 24 then descends the terrain irregularity 60, as shown in FIGS. 5-6, the controller 38 can detect the cutter height signal and wheel angle signal changing in order to activate one or more of the actuators 34A, 34B, 34C and control the vertical movement and/or tilting of the header 24 to keep the height H of the cutter 40 and a cutter angle $\alpha C$ of the cutter 40 relative to the ground surface 62 more constant by detecting and following the contour of the terrain irregularity 60. In most conditions, the cutter angle $\alpha C$ will ideally be 8-20° relative to the ground surface 62, as shown in FIG. 5. The controller 38 can therefore be configured to maintain the height H and cutter angle $\alpha C$ of the cutter 40 at respectively desired values, which will vary by crop being collected and can be programmed into the controller 38, by appropriately activating one or more actuators 34A, 34B, 34C when necessary.

It should therefore be appreciated that the controller 38 of the header 24 shown in FIGS. 2-6 can be configured to compare the cutter height signal from the cutter sensor 40 and the wheel angle signal from the wheel sensor 48 to determine when a terrain irregularity is present and activate one or more of the actuators 34A, 34B, 34C accordingly so the header 24 does not contact the terrain irregularity. It should be further appreciated that the controller 38 can be configured in a variety of ways to detect differences in the cutter height signal and wheel angle signal and responsively activate one or more of the actuators 34A, 34B, 34C appropriately, depending on the configuration of the agricultural vehicle 20. Further, the controller 38 can be configured to take other factors into account, such as a speed of the vehicle 20 and a rate of change in the wheel angle $\alpha W$, to determine which of the actuators 34A, 34B, 34C to activate in order to avoid damage to the header 24 as well as predict characteristics of terrain in front of the header 24 as the vehicle 20 travels forward.

Figure 7:
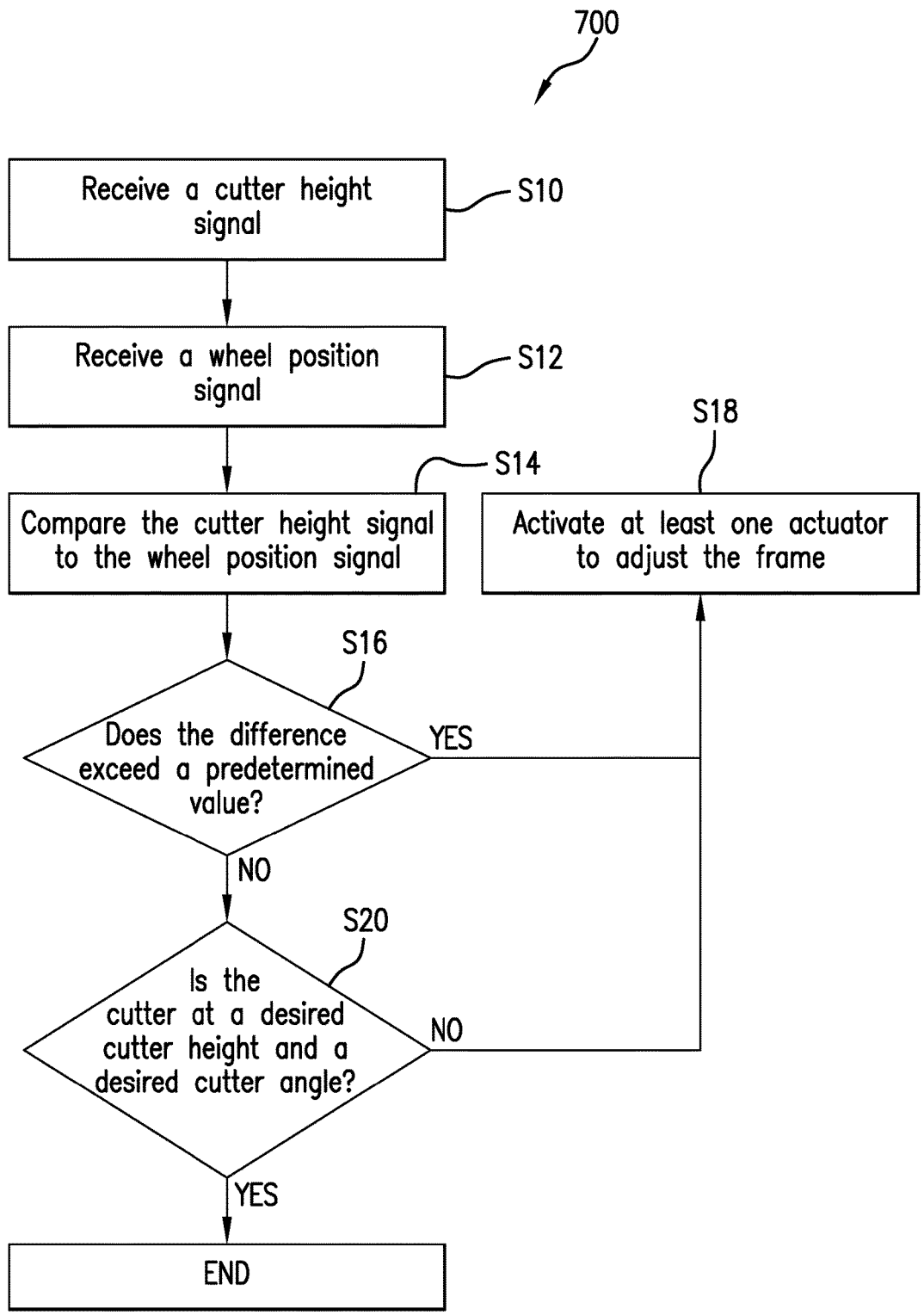
FIG. 7 is a flow chart illustrating operation of a controller according to an exemplary embodiment of the present invention.
Figure 8:
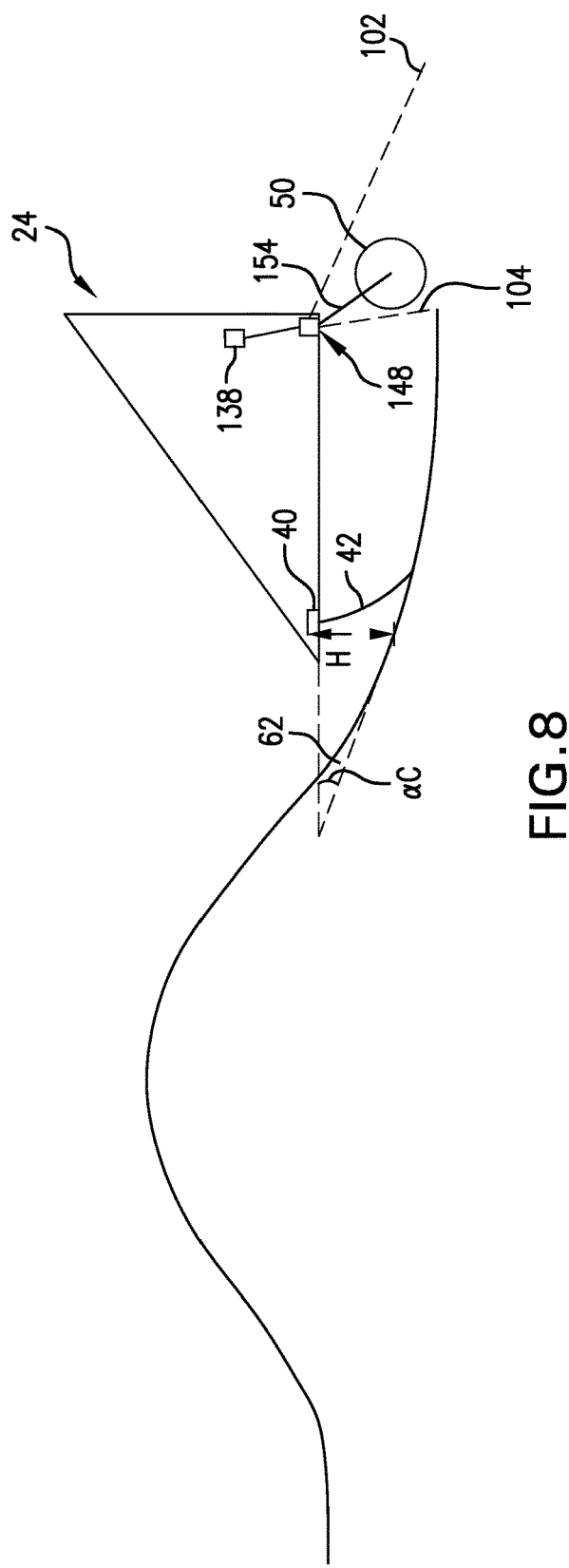
FIG. 8 is a side view of the agricultural vehicle shown in FIG. 1 with another exemplary embodiment of a wheel sensor and controller approaching a slope.
Figure 9:
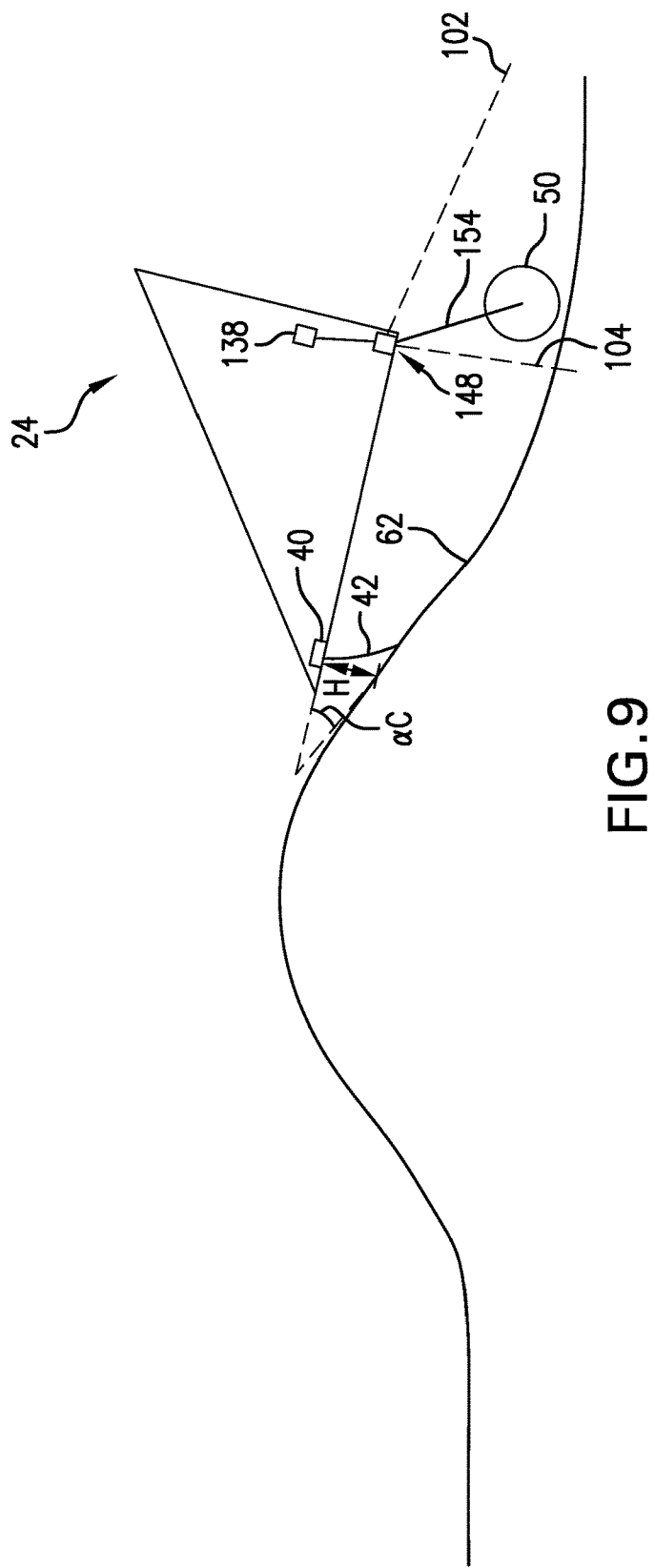
FIG. 9 is a side view of the agricultural vehicle shown in FIG. 8 as the header is traveling up the slope.
Figure 10:
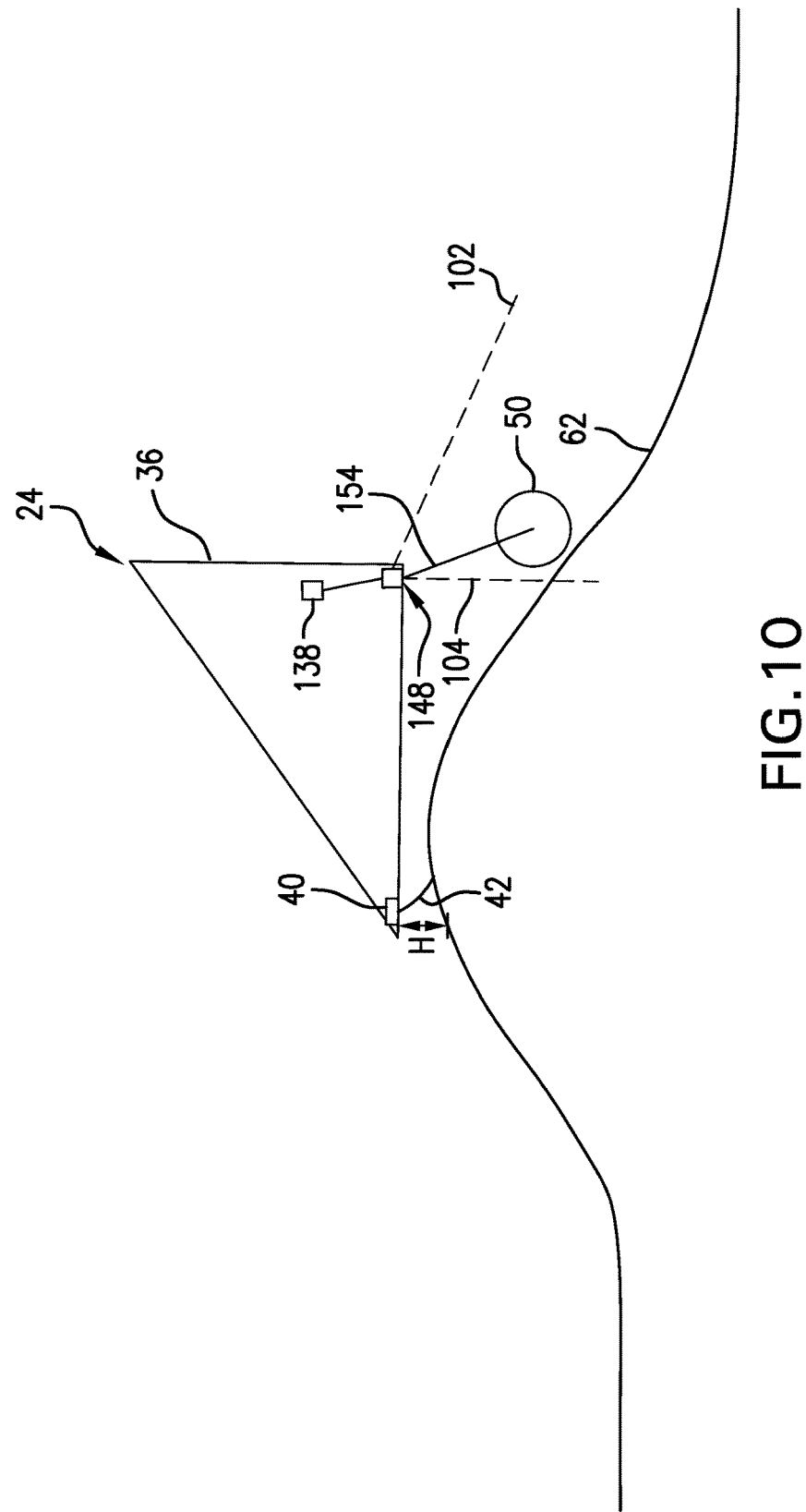
FIG. 10 is a side view of the agricultural vehicle shown in FIGS. 8-9 when the header is near a top of the slope.
Figure 11:
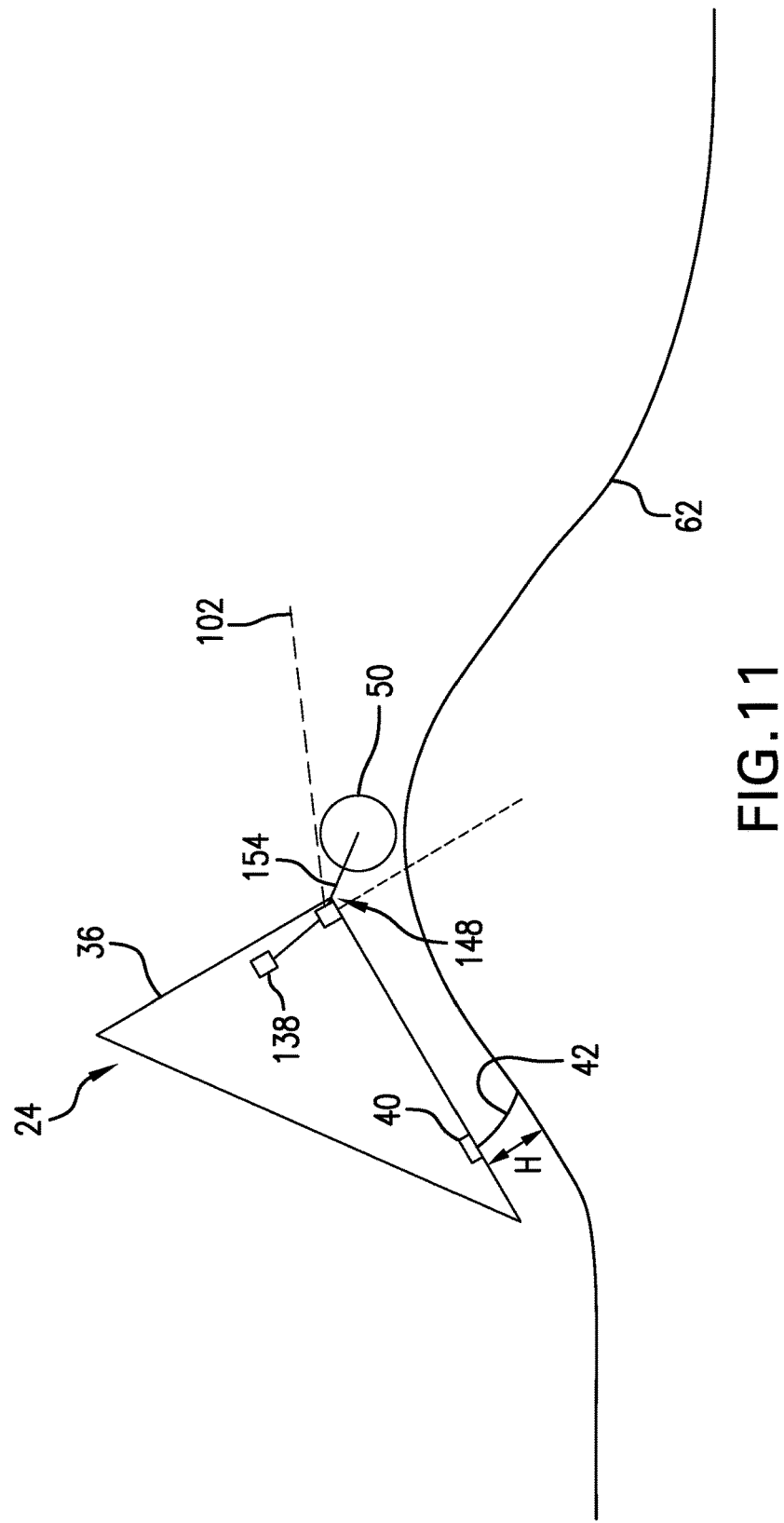
FIG. 11 is a side view of the agricultural vehicle shown in FIGS. 8-10 as the header descends down the slope.

Referring now to FIG. 7, a flow chart illustrating an exemplary method 700 performed by the controller 38 in accordance with the present invention is shown. As can be seen, the controller 38 receives S10 the cutter height signal and also receives S12 the wheel angle signal. The controller 38 compares S14 the cutter height signal and the wheel angle signal to determine if a terrain irregularity is present, such as by determining S16 whether a difference between magnitudes of the cutter height signal and the wheel angle signal exceeds a predetermined value. If the controller 38 determines a terrain irregularity is present, the controller 38 responsively activates S18 one or more of the actuators 34A, 34B, 34C to adjust the frame 36 of the header 24. The controller 38 can also be configured to determine S20 whether the cutter 40 is at a desired cutter height and a desired cutter angle relative to the ground surface 62 and, if not, activate S18 one or more of the actuators 34A, 34B, 34C to adjust the frame 36 and return the cutter 40 to the desired cutter height and desired cutter angle, i.e., maintain the desired cutter height and desired cutter angle of the cutter 40.

Figure 12:
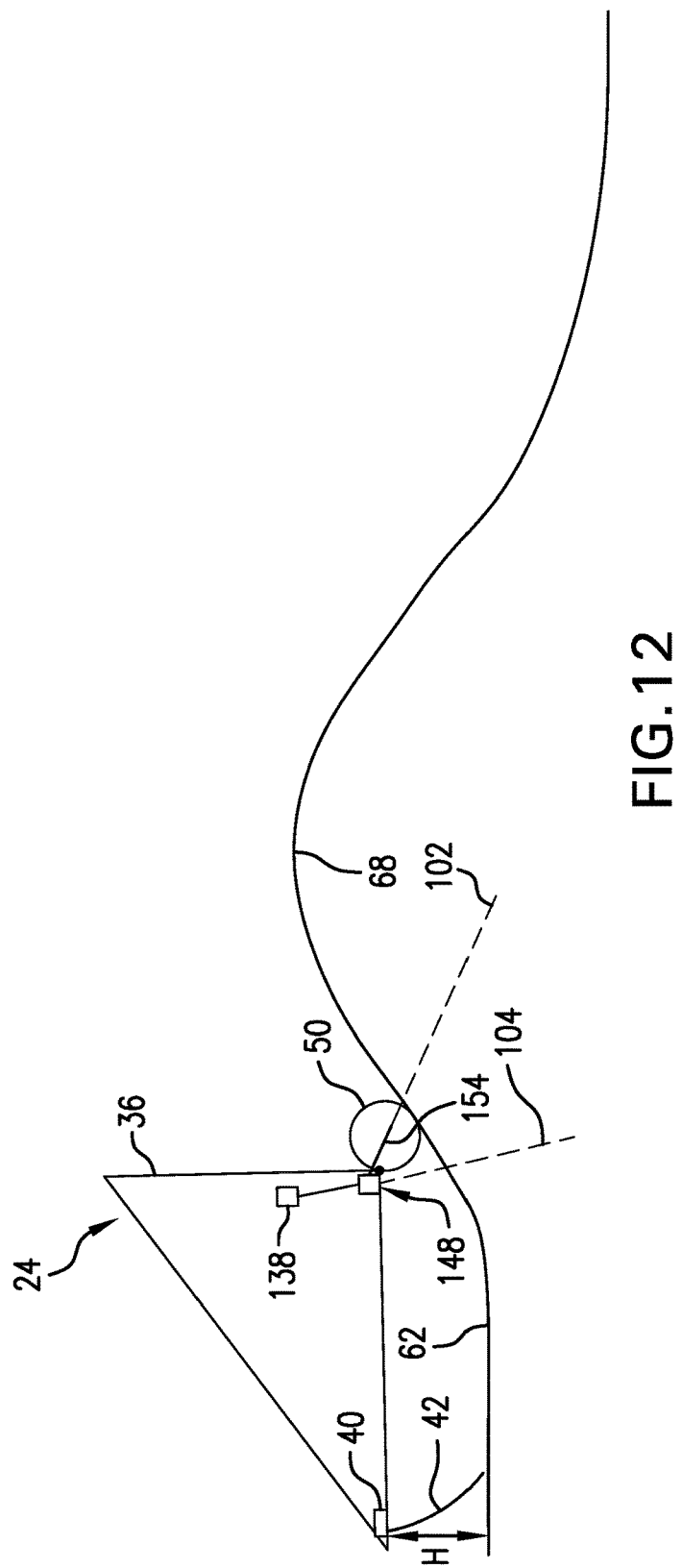
FIG. 12 is a side view of the agricultural vehicle shown in FIGS. 8-11 as the header approaches a bottom of the slope.

Referring now to FIGS. 8-12, the header 24 is shown traveling across the same terrain irregularity 60 shown in FIGS. 2-6. However, the header 24 includes a wheel sensor 148 which, while structured similarly to the wheel sensor 48 shown in FIGS. 2-6, does not detect changes in a wheel angle $\alpha W$ of the gauge wheel 50 to output a wheel angle signal like the previously described wheel sensor 48. Rather, the wheel sensor 148 is configured to output a wheel overload signal to a controller 138 when the wheel sensor 148 detects that the gauge wheel 50 is linearly and/or angularly displaced to a stroke end, indicated by line 102 in FIGS. 8-12, from a neutral position, indicated by line 104 in FIGS. 8-12. Upon the controller 138 detecting the wheel overload signal, the controller 138 can responsively activate one or more of the actuators 34A, 34B, 34C to adjust the frame 36 of the header 24. In this sense, the wheel sensor 148 is configured as an overload sensor, only outputting the wheel overload signal when the gauge wheel 50 is linearly and/or angularly displaced to the stroke end 102. The gauge wheel 50, for example, pivoting to the stroke end 102 indicates excessive pivoting of the gauge wheel 50 causing the spring 56 (shown in FIG. 1) of the gauge wheel 50 to be overly compressed, which leads to the spring 56 attempting to decompress and potentially lifting the vehicle 20 in the process. In FIGS. 8-11, it can be seen that the gauge wheel 50 has not reached the stroke end 102. However, as shown in FIG. 12, there can be situations where the gauge wheel 50 is pivoted to the stroke end 102 and the cutter sensor 40 is off the ground surface 62. In known HHC systems, the cutter sensor being lifted off the ground surface would typically cause the HHC system controller to lower the header which could lead to a situation where the header and/or vehicle is severely damaged when the gauge wheel spring 56 is overly compressed.

In an exemplary embodiment of the present invention, such a situation can be avoided due to the wheel sensor 148 outputting the wheel overload signal to the controller 138 upon the gauge wheel 50 reaching the stroke end 102. The wheel sensor 148 can output the wheel overload signal when, for example, a current angular position of an arm 154 of the wheel sensor 148 relative to a mount 152 of the wheel sensor 148 reaches a gauge wheel overload position relative to the mount 152, which indicates the gauge wheel 50 has reached the stroke end 102. Upon the controller 138 detecting the wheel overload signal, the controller 138 activates one or more of the actuators 34A, 34B, 34C to raise and/or tilt the frame 36 of the header 24 so the gauge wheel 50 pivots to a position before the stroke end 102. For example, as shown in FIG. 12, the controller 138 can be configured to responsively activate the height actuator 34A so the gauge wheel 50 pivots to an angular position before the stroke end 102 to avoid over-compression of a spring 56 of the gauge wheel 50, i.e., the gauge wheel 50 is no longer displaced to the stroke end 102. While this sequence may lead to a temporary increase of the height H of the cutter 40 relative to the ground surface 62 above a desired level, such a temporary increase is a better outcome than the substantial damage that can occur if the frame 36 were to be lowered while the gauge wheel 50 is pivoted to the stroke end 102.

To ensure the cutter 40 returns to a desired height and cutter angle following the controller 138 detecting the wheel overload signal, the controller 138 can also be coupled to the cutter sensor 42. The controller 138 can also be configured to store a desired height of the cutter 40 relative to the ground surface 62, which can be compared to the current height H of the cutter 40 sensed by the cutter sensor 42, as well as a desired cutter angle of the cutter 40 relative to the ground surface 62, which can be compared to the current cutter angle $\alpha C$ relative to the ground surface 62. Upon the controller 138 detecting that the current height H is not equal to the desired cutter height and/or the current cutter angle $\alpha C$ is not equal to the desired cutter angle, the controller 138 can determine whether the wheel overload signal is present. If the wheel overload signal is not present, the controller 138 can activate one or more appropriate actuators 34A, 34B, 34C to tilt and/or vertically move the frame 36 of the header 24 to put the current height H and/or current cutter angle $\alpha C$ of the cutter 40 to the respectively desired values. If the controller 138 detects the wheel overload signal while attempting to return the cutter 40 to the desired cutter height and/or desired cutter angle, the controller 138 can responsively activate one or more appropriate actuators 34A, 34B, 34C to prevent over-compression of the spring 56. The controller 138 can then re-attempt to return the cutter 40 to the desired cutter height and/or desired cutter angle until the current height H and current cutter angle $\alpha C$ of the cutter 40 are equal to the desired cutter height and desired cutter angle, respectively, and the wheel overload signal is not detected by the controller 138.

Figure 13:
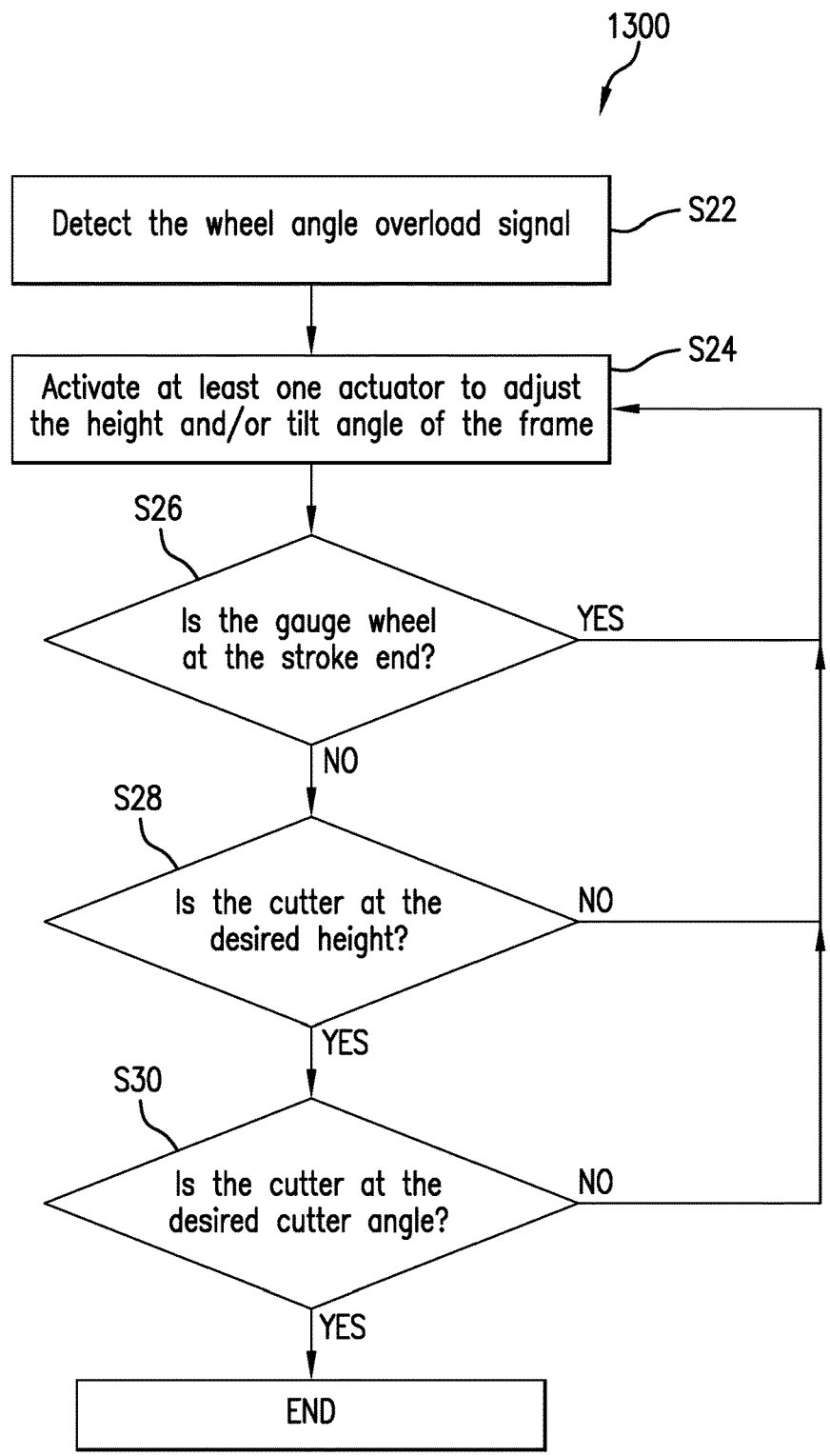
FIG. 13 is a flow chart illustrating operation of a controller according to another exemplary embodiment of the present invention.

Referring now to FIG. 13, a flow chart illustrating an exemplary method 1300 performed by the controller 138 in accordance with the present invention is shown. When the gauge wheel 50 reaches the stroke end 102, the wheel sensor 148 can output the wheel overload signal, with the controller 138 detecting S22 the wheel overload signal. The controller 138 can then activate S24 one or more of the actuators 34A, 34B, 34C responsively to receiving the wheel overload signal in order to adjust the height and/or tilt angle of the frame 36 of the header 24, which adjusts the height and/or tilt angle of the cutter 40. After activating S24 one or more of the actuators 34A, 34B, 34C, the controller 138 can determine S26 whether the gauge wheel 50 is still at the stroke end 102 after adjusting the height and/or tilt angle of the frame 36. If the controller 138 determines that the gauge wheel 50 is still at the stroke end 102 after adjusting the height and/or tilt angle, the controller 138 can once again activate S24 one or more of the actuators 34A, 34B, 34C to adjust the height and/or tilt angle of the frame 36, repeating as necessary until the gauge wheel 50 is no longer at the stroke end 102. The controller 138 can also be configured to store a desired height of the cutter 40 and to determine S28 whether the cutter 40 is at the desired height by receiving signals from the cutter sensor 42 associated with the cutter 40. If the cutter 40 is not at the desired height, the controller 138 can activate S24 one or more of the actuators 34A, 34B, 34C to adjust the height and/or tilt angle of the frame 36 to place the cutter 40 at the desired height. While the controller 138 activates S24 one or more of the actuators 34A, 34B, 34C to return the cutter 40 to the desired height, the controller 138 can also be constantly determining S26 whether the gauge wheel 50 is at the stroke end 102, with the controller 138 prioritizing keeping the gauge wheel 50 below the stroke end 102 over adjusting the cutter 40 height to the desired height by activation S24 of one or more actuators 34A, 34B, 34C. Similarly, the controller 138 can also store a desired cutter angle and be configured to determine S30 whether the cutter 40 is at the desired cutter angle. If the cutter 40 is not at the desired cutter angle, the controller 138 can be configured to activate S24 one or more of the actuators 34A, 34B, 34C to adjust the tilt angle and/or height of the frame 36 until the cutter 40 is at the desired cutter angle. While the controller 138 activates S24 one or more of the actuators 34A, 34B, 34C to return the cutter 40 to the desired cutter angle, the controller 138 can also be constantly determining S26 whether the gauge wheel 50 is at the stroke end 102, with the controller 138 prioritizing keeping the gauge wheel 50 below the stroke end 102 over adjusting the cutter angle to the desired cutter angle by activation S24 of the actuator(s) 34A, 34B, 34C. It should therefore be appreciated that the controller 138 can be configured in a variety of ways to avoid substantial damage to the header 24 and/or vehicle 20 by controlling the actuator system 34 to keep the gauge wheel 50 from reaching the stroke end 102 while also keeping the operating position and orientation of the cutter 40 at desired levels.

It is to be understood that the steps of the methods 700 and 1300 are performed by their respective controller 38, 138 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 38, 138 described herein, such as the methods 700 and 1300, is implemented in software code or instructions which are tangibly stored on a tangible computer readable medium. Upon loading and executing such software code or instructions by the controller 38, 138, the controller 38, 138 may perform any of the functionality of the controller 38, 138 described herein, including any steps of the methods 700 and 1300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A header system, comprising:
   a frame;
   a cutter carried by said frame;
   a cutter height sensor associated with said cutter and configured to output a cutter height signal;
   a gauge wheel carried by said frame behind said cutter;
   a wheel sensor associated with said gauge wheel and configured to output a wheel position signal; and
   a controller electrically coupled to said cutter height sensor and said wheel sensor, said controller configured to:
   receive said cutter height signal;
   receive said wheel position signal;
   compare said cutter height signal to said wheel position signal to determine that a terrain irregularity is present; and
   activate at least one actuator of an actuator system to adjust said frame in response to said determining that said terrain irregularity is present.

2. The header system according to claim 1, wherein said wheel sensor includes an arm pivotally coupled to a mount and connected to said gauge wheel, said arm having a current angular position relative to said mount, said arm defining a neutral angular position relative to said mount, said wheel sensor being configured to output a wheel angle signal with a magnitude corresponding to a deviation of said current angular position of said arm relative to said neutral angular position.

3. The header system according to claim 2, wherein said cutter height sensor is configured to output said cutter height signal with a magnitude corresponding to a height of said cutter from a ground surface.

4. The header system according to claim 3, wherein said controller is further configured to determine said terrain irregularity is present when a difference between said magnitude of said wheel angle signal and said magnitude of said cutter height signal exceeds a predetermined value.

5. The header system according to claim 4, further comprising said at least one actuator system electrically coupled to said controller and configured to adjust at least one of a height and a tilt angle of said frame, wherein said controller is further configured to determine which at least one actuator of said actuator system to activate based on said determined difference between said magnitude of said wheel angle signal and said magnitude of said cutter height signal.

6. The header system according to claim 1, further comprising said actuator system electrically coupled to said controller and configured to adjust at least one of a height and a tilt angle of said frame.

7. The header system according to claim 6, wherein said controller is configured to activate at least one actuator of said actuator system further in order to maintain a desired cutter height and a desired cutter angle of said cutter relative to a ground surface.

8. The header system according to claim 6, wherein said tilt angle is at least one of a fore-aft tilt angle and a lateral tilt angle and said actuator system includes at least one of a fore-aft actuator configured to adjust said fore-aft tilt angle of said frame and a lateral actuator configured to adjust said lateral tilt angle of said frame.

9. A header system, comprising:
   a frame;
   a cutter carried by said frame;
   a gauge wheel carried by said frame behind said cutter;
   a wheel sensor associated with said gauge wheel and configured to output a wheel overload signal when said wheel sensor detects said gauge wheel is displaced to a stroke end; and
   a controller electrically coupled to said wheel sensor, said controller configured to:
   detect said wheel overload signal; and
   activate at least one actuator of an actuator system to adjust said frame in response to receiving said wheel overload signal.

10. The header system according to claim 9, further comprising said actuator system electrically coupled to said controller and configured to adjust at least one of a height and a tilt angle of said frame.

11. The header system according to claim 10, wherein said actuator system includes a fore-aft actuator configured to adjust a fore-aft tilt angle of said frame and said controller is configured to activate said fore-aft actuator to adjust said fore-aft tilt angle of said frame until said gauge wheel is no longer displaced to said stroke end.

12. The header system according to claim 10, wherein said actuator system further includes a height actuator configured to adjust said height of said frame and said controller is configured to activate said height actuator to adjust said height of said frame until said gauge wheel is no longer displaced to said stroke end.

13. The header system according to claim 9, wherein said wheel sensor includes an arm pivotally coupled to a mount and connected to said gauge wheel, said arm having a current angular position relative to said mount, said arm defining a gauge wheel overload position relative to said mount, said wheel sensor being configured to output said overload signal when said current angular position of said arm reaches said gauge wheel overload position.

14. The header system according to claim 9, wherein said header system includes a cutter height sensor associated with said cutter and configured to output a cutter height signal corresponding to a height of said cutter to said controller.

15. The header system according to claim 14, wherein said controller is further configured to store a desired height of said cutter and to activate said at least one actuator of said actuator system to adjust said frame until said height of said cutter is equal to said desired height and said wheel overload signal is not detected by said controller.

16. The header system according to claim 14, wherein said controller is further configured to store a desired cutter angle of said cutter and to activate said at least one actuator of said actuator system to adjust said frame until a cutter angle of said cutter is equal to said desired cutter angle and said wheel overload signal is not detected by said controller.

17. The header system according to claim 14, wherein said controller is further configured to store a desired height and a desired cutter angle of said cutter and to activate said at least one actuator of said actuator system to adjust said frame until said height is equal to said desired height, a cutter angle of said cutter is equal to said desired cutter angle, and said wheel overload signal is not detected by said controller.

\* \* \* \* \*